(12) United States Patent
Acosta-Cazaubon

(10) Patent No.: US 8,488,848 B2
(45) Date of Patent: Jul. 16, 2013

(54) VISUAL VOTING METHOD

(75) Inventor: Jesus Acosta-Cazaubon, Atlanta, GA (US)

(73) Assignee: Yottavote, Inc., Smyrna, GA (US)

( * ) Notice: Subject to any disclaimer, the term of this patent is extended or adjusted under 35 U.S.C. 154(b) by 173 days.

(21) Appl. No.: 13/268,194

(22) Filed: Oct. 7, 2011

(65) Prior Publication Data

US 2013/0089244 A1 Apr. 11, 2013

(51) Int. Cl.
*G06K 9/00* (2006.01)
(52) U.S. Cl.
USPC ........... 382/118; 382/119; 382/218; 382/115; 382/124; 382/209; 340/5.1; 340/5.2; 713/186
(58) Field of Classification Search
CPC ............. G06K 9/00228; G06K 9/00221; G06F 17/30256; G06F 21/32
USPC ................. 382/118, 119, 115, 218, 124, 209; 340/5.1, 5.2; 713/186
See application file for complete search history.

(56) References Cited

U.S. PATENT DOCUMENTS

| | | | | |
|---|---|---|---|---|
| 5,412,727 | A | * | 5/1995 | Drexler et al. ................ 713/186 |
| 6,081,793 | A | * | 6/2000 | Challener et al. ............... 705/50 |
| 2005/0092835 | A1 | * | 5/2005 | Chung et al. .................. 235/386 |

* cited by examiner

*Primary Examiner* — Mike Rahmjoo
(74) *Attorney, Agent, or Firm* — Tracy Jong Law Firm; Tracy P. Jong; Cheng Ning Jong

(57) ABSTRACT

The present invention is directed toward a system and a method for conducting a visual referendum of a subject including at least one voter, at least one referendum marker and at least one referendum answer. A digital image of the subject is first provided. The voter, referendum marker and referendum answer are then parsed of the subject from the digital image. A target referendum, a target voter and a target referendum answer are then identified based on the referendum marker, voter and referendum answer respectively. This is followed by associating the target referendum answer to the target referendum. The target voter is then associated with the target referendum.

10 Claims, 9 Drawing Sheets

VISUAL VOTING METHOD

RELATED APPLICATIONS

U.S. Ser. No. 13/211,397 by Applicant is co-pending. No claim of priority is made.

BACKGROUND OF THE INVENTION

1. The Field of the Invention

The present invention is directed generally to a visual voting method. More specifically, the present invention is directed to a method which processes an image containing a subject to generate a referendum result which is then linked to a referendum and a voter.

2. Background Art

Organized surveys and referendums have been in use for a long time for generating statistics. Statistics can be unreliable since the data source (e.g., the organization collecting the data, the characteristics of the voters and the circumstances surrounding the survey or referendum) is rarely disclosed or even specified. Therefore, statistical data is often not regarded as meaningful or reliable unless it is generated or collected by a well-respected source. Statistical data may also be tampered with and the results may be forged. The cost of correcting or auditing a survey or referendum can be cost prohibitive. Forged referendum results or inaccurate reporting of statistical data have become even more prevalent with internet technology and social networks as the ease with which statistical data is disclosed or published has greatly improved. Conventionally, the identity of voters of a survey or referendum is concealed for privacy purposes. Privacy, while required in many circumstances, can engender fraud as the information which it is designed to protect cannot be readily verified. Further, referendum results may also be used to promote a product or a service. Excessive use of such referendum results has diluted their effectiveness as the recipients of such advertising effort have grown accustomed to the advertising.

It is also not uncommon for advertisers to use generic photographs to represent their products, which over time, also dilutes the effectiveness of their advertising effort. The subjects in these photographs are typically actors who are not necessarily endorsing the products which they appear with. In rare cases, photographs which associate voters with their votes (referendum answers) and the referendums they are voting exist. However, such associations are done manually on an ad hoc basis. Such associations carry little weight as an advertising tool as they represent the opinions or choices of a few individuals. In order to increase the impact of such advertising, the number of images showing association of voters and the referendums they voted for will need to be increased.

One solution to increase the use of images lies in the ability to process the images automatically. In addition, automatic processing typically improves accuracy over manual processing as manual identification of a person's face can be erroneous.

There are no existing systems which create automatic associations of voters, their votes and the referendums they voted for.

Furthermore, votes are typically submitted one at a time. There are no existing systems that are capable of receiving multiple votes as a group and parsing these votes into respective voters, their corresponding votes and the referendum the voters voted for. In addition to conveying a stronger message to a viewer, capturing multiple votes at once aids in building the size of a statistical pool as votes are added much more quickly with less effort.

U.S. Pat. Pub. No. 2009/0029725 discloses a method for responding to an advertisement using a mobile device. FIG. 6 of publication '725 illustrates an embodiment in which members of the public are requested to vote for their preferred contestant. As the name or photograph of contestant appears on the television screen, an information element in the form of a two-dimensional barcode also appears on the screen. Viewers are invited to register a vote for a contestant. The barcode has encoded therein three different data components of content: (a) a reply identifying the preferred contestant; (b) content (channel ID) identifying the particular television programme within a series of programmes presenting the same competition; and (c) the standard telephone number to which the content of the information element needs to be communicated for the viewer to register their vote. Although this system facilitates the voting process of a television viewer, a submitted vote is not associated with the face of a voter, thereby lacking the confidence bolstering effect of displaying the identity of a voter alongside his or her vote.

Thus, there arises a need for a visual voting method that reveals the identity of a voter where the voter is automatically identified and the referendum result of the voter is automatically tallied and displayed alongside the identity of the voter on a digital site upon receiving permission for such revelation.

SUMMARY OF THE INVENTION

The present invention is directed toward a system and a method for conducting a visual referendum of a subject including at least one voter, at least one referendum marker and at least one referendum answer. The method comprises:
- (a) providing a digital image of the subject;
- (b) parsing the at least one voter, the at least one referendum marker and the at least one referendum answer of the subject from the digital image;
- (c) identifying a target referendum based on the at least one referendum marker and identifying at least one target voter based on the at least one voter and identifying at least one target referendum answer based on the at least one referendum answer;
- (d) associating the at least one target referendum answer to the target referendum; and
- (e) associating the at least one target voter to the target referendum.

Accordingly, it is a primary object of the present invention to provide a visual voting method that automatically processes and associates a vote to a referendum.

It is another object of the present invention to provide a visual voting method that automatically associates multiple votes to a referendum using only one digital image.

It is yet a further object of the present invention to provide a visual voting method that protects the privacy of a voter by automatically obscuring the identity of the voter if so desired by the voter.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is a flowchart detailing a process by which a digital image is automatically reduced to a voter, his referendum answer and the referendum he voted for.

PARTS LIST

Figure 1:
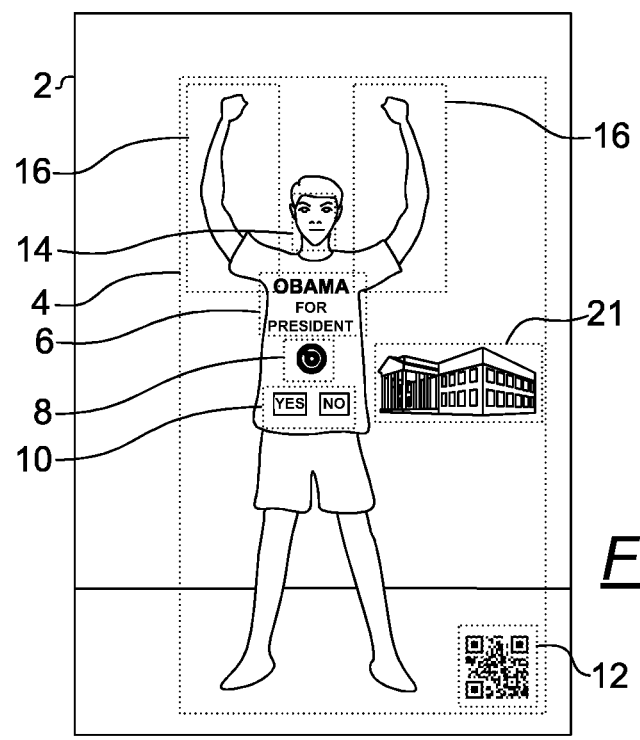
FIG. 1 depicts a digital image of a subject including a voter, referendum identifiers expressed in text, symbol and code, a referendum answer expressed in text, gestures and background graphics.

2—digital image
4—subject of digital image for visual voting
6—text—a referendum identifier
8—symbol—a referendum identifier
10—referendum answer in text—a referendum answer identifier
12—quick response (QR) Code—a referendum identifier
14—voter as identified by his/her face
16—referendum answer expressed as a gesture—a referendum answer identifier
18—cardboard on which referendum voting information is disposed
20—cover for obscuring a referendum answer selection
21—background graphics
22—step of providing digital image of a subject
24—step of parsing the subject into a voter, a referendum marker and a referendum answer
26—step of identifying a target referendum, a target voter and a target referendum answer
28—step of associating a target referendum answer to target referendum
30—step of associating a target voter to target referendum and target referendum answer
32—step of querying a target voter for willingness to disclose his identity. If target voter is unwilling, the face of the target voter in the digital image is obscured
34—step of displaying the digital image at a site corresponding to the target voter and/or the target referendum
36—distance between centroid of a face and centroid of a gesture
38—distance between centroid of a face and centroid of a gesture
40—step of calculating distances between centroid of a face
42—step of resetting face index to point to the face at top of the face list
44—step of selecting two shortest distances of face pointed to by face index and comparing the distances to a maximum threshold
46—step of checking whether a gesture should be associated with a face
48—step of associating a face to a referendum answer "YES"
50—step of advancing face index
52—step of detecting whether all faces have been processed
54—referendum pool server
56—social network

PARTICULAR ADVANTAGES OF THE INVENTION

The present visual voting method provides a method that automatically processes votes based on a digital image and associate a voter with his or her vote and the referendum involved. The present voting method further enables simple and simultaneous submission of multiple votes from more than one voter. The present visual voting method further provides a way to demonstrate the commitment of voter and to prove that a vote cast by the voter is genuine by associating a vote to a face. Prior art face recognition systems are capable of parsing faces from a digital image, comparing selected features of the faces to selected features of faces previously saved in a database and determining whether matches have been found. The present visual voting method went further by establishing links between faces, referendums and referendum answers. The present visual voting method is capable of detecting gesture images, thereby eliminating the need for providing a subject detail, i.e., referendum answers in text, symbol or code. In images where multiple votes are cast in one digital image, the present visual voting method is capable of associating a gesture image with the voter causing the gesture image. Therefore, the present visual voting method is capable of processing positive or negative votes in one digital image. The present visual voting method also eliminates the need for attaching a code during post processing to a digital image to identify a referendum and an answer associated with the referendum. Further, the present visual voting method eliminates the need for manually associating the subject detail of a digital image to a referendum, thereby eliminating additional effort in processing the digital image and opportunities to make mistakes.

DETAILED DESCRIPTION OF A PREFERRED EMBODIMENT

As used herein, the term gesture means a visual expression of a part of a human body or an inanimate object that is captured in an image of the form of motion or motionless digital images, wherein the gesture is both visually and digitally discernible from its surroundings and capable of being picked out by a pattern matching software.

As used herein, the term subject refers to elements of a digital image that are processed and picked out such that associations may be formed between at least three elements. A subject includes a referendum, a corresponding referendum answer and a corresponding voter.

FIG. 1 depicts a digital image 2 of a subject 4 including a voter identified by his or her face, referendum identifiers expressed in text 6, symbol 8 and code 12, a referendum answer expressed in text 10 and gestures 16 and background graphics 21. FIG. 1 includes features that are contemplated in the present invention although it is unnecessary to incorporate all of these features simultaneously in one setting for the present invention to function properly. All digital images suitable for the present visual voting method share one common thread, i.e., each of the images includes a means to identify at least one voter, a means to identify the referendum that the voter is voting for and a means to identify the answer cast by the voter in response to the referendum. In the present invention, the means to identify at least one voter is by identifying a voter's face. In one embodiment, face recognition is carried out according to known methods, for example the algorithms according to Viewdle.

In a present digital image, a referendum is identified by text, symbol or code. In processing text, symbol or code, the optical character recognition (OCR) technique is first applied to the digital image to parse texts, symbols or codes from the digital image.

In one embodiment, the digital image is parsed for texts, symbols or codes in three separates passes. If a code is detected, the referendum indicated by the code is deciphered. The code is preferably captured as part of the subject 4. Alternatively, the code is overlaid onto or otherwise attached to the digital image after the digital image has been captured, i.e., during post processing of the digital image. The code includes a quick response (QR) code, barcode or other non-text coding means.

If a symbol is detected, the symbol is compared to one or more lists of known symbols so that its corresponding meaning can be determined. In the present embodiment, a symbol is used to represent a referendum. It shall be understood that a symbol may also be used to indicate a specific answer to a specific referendum.

If text is detected, the text is compared to one or more lists of known words or strings of text so that its corresponding meaning can be determined. In the present embodiment, text is used to indicate a referendum or a specific answer to a specific referendum. It shall be understood that a word or string of text may also be used to indicate a specific answer to a specific referendum and the specific voter that cast the vote.

In order to entice potential users to websites utilizing the present invention, an additional step is taken to incorporate a theme image associated with each digital image if it does not already contain such an image. A theme image, as used herein, is an image that reflects the referendum contained in a digital image. The Applicant discovered that by incorporating theme images to the present digital images, viewership is improved. As an example in the FIG. 1, a graphics representing the white house may be inserted into the present digital image to reflect on the referendum of "Obama for President" as the white house is a symbol of the US government or the president. In the case of a referendum such as "I love Paris," it is natural to incorporate a theme image of the Eiffel Tower to the referendum as the image of the Eiffel Tower evokes the memory of Paris. In one embodiment, a geographical location is embedded in each digital image. In one aspect, the geographical location is manually associated with a digital image. In another aspect, the geographical location is automatically associated or embedded in each digital image taken with a camera equipped with global positioning system (GPS) capability. A geographical location of a digital image makes selection of theme images easier by matching the geographical location with the geographical location of theme images.

Figure 2:
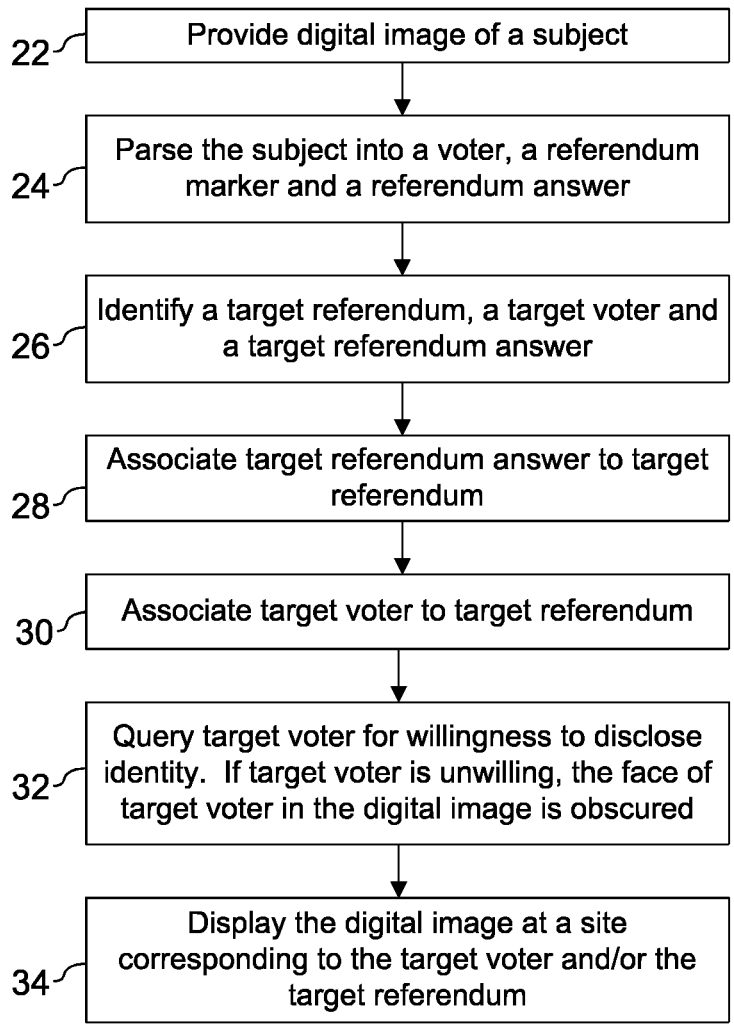

FIG. 2 is a flowchart detailing a process by which a digital image is automatically reduced to a voter, his referendum answer and the referendum he voted for. A digital image is first obtained of a subject. The subject can be multiple voters voting for one referendum or multiple referendums. A typical setting for capturing a subject can be a populated stadium of a sporting event. Attendants who feel strongly about a particular issue or referendum may desire to demonstrate their opinions to their circles of friends in their social networks. A sporting event, convention, dinner at a restaurant and the like, present such an opportunity. The present invention allows one to not only express one's opinion by donning an outfit or holding a sign that shows a referendum answer in a live event but also to memorialize his or her opinion on an issue or referendum by linking it to a referendum or a user account.

Having described the processing of a digital image, the present novel steps can be summarized as follows. First, in step 22, a digital image of a subject is provided. In one embodiment, a digital signature is embedded in the digital image to prevent unauthorized use of images and potential privacy intrusion. In case the digital image is posted or reposted without permission, it may be tracked. The subject includes at least one voter as there can be multiple voters, at least one referendum marker as there can be one unique referendum associated with each voter and at least one referendum answer as there is an answer for each referendum marker. In step 24, at least one voter, at least one referendum marker and at least one referendum answer are parsed. Then in step 26, a target referendum, a target voter and a target referendum answer are identified. In identifying a target referendum, the at least one referendum marker is compared to a list of known referendums. The list of known referendums can be any database of referendums, or in this case, a referendum pool server as disclosed in U.S. patent application Ser. No. 13/211,397 to the Applicant. If the referendum marker matches a member of the list of known referendums, the member of the list of known referendums is identified as the target referendum. If the referendum marker does not match any members of the list of known referendums, the referendum marker is added to the list of known referendums. In identifying a target voter, the at least one voter is compared to a list of known individuals. If the at least one voter matches a member of the list of known individuals, the member of the list of known individuals is identified as a target voter. If the at least one voter does not match a member of the list of known individuals, the at least one voter is added to the list of known individuals. In identifying a target referendum answer, the at least one referendum answer is compared to a list of known answers. If the at least one referendum answer matches a member of the list of known answers, the member of the list of known answers is identified as a target answer. If the at least one referendum answer does not match a member of the list of known answers, the at least one referendum answer is discarded.

In step 28, the at least one target referendum answer is associated with the target referendum. For example, upon determining the answer to the referendum "Obama for President, the answer is associated with the referendum in the list of referendums to which the referendum "Obama for President" belongs.

In step 30, the at least one target voter is associated with the target referendum and the at least one target referendum answer. For example, upon determining the identity of the target voter, the voter is associated with the target voter in a list of voters of a database. The database can be maintained by a social network provider and the like.

As multiple votes can be received in one image, there may be individuals who do not want to be identified. These individuals can request to have their identifying features obscured by face blurring technology. In one embodiment, face blurring is carried out according to known methods which share the same core technology as face recognition algorithms, for example the algorithms according to Viewdle or UIUC. In step 32, upon identifying the target voter, he or she is queried for his or her willingness to disclose identity. A query can take the form of an email notification or a question posted in a secured account where the digital image is intended to be posted. If the target voter indicates unwillingness, the face of the target voter in the digital image is obscured. If the target voter agrees to such query, the face of the target voter is displayed at a site corresponding to the target voter and/or the target referendum as shown in step 34.

Figure 3:
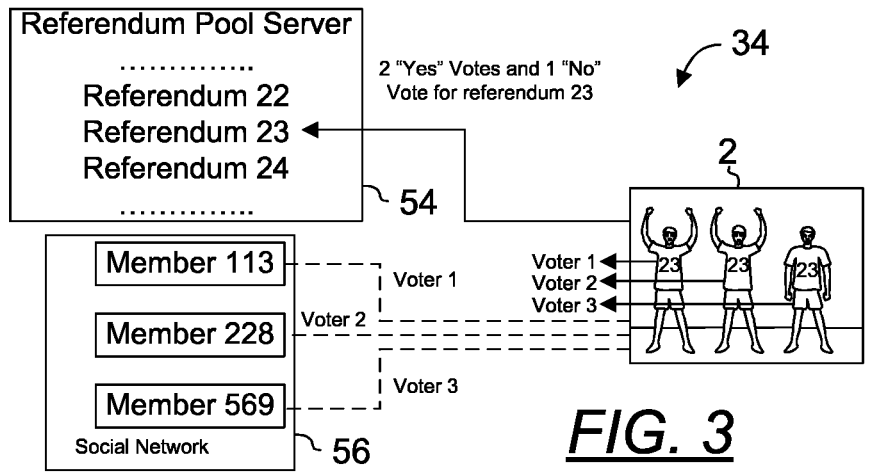
FIG. 3 is a diagram depicting the step of associating a digital image to target voters and a target referendum.

FIG. 3 is a diagram depicting the step 34 of associating a digital image to target voters and target referendum. Reference is made to a referendum pool server 54 of the Applicant's co-pending application Ser. No. 13/211,397, which is hereby incorporated by reference as though set forth in full herein for its teaching regarding referendum pool server. In this example, the target referendum is referendum "23" of the referendum pool server 54 and voters 1, 2 and 3 are identified as member "113," "228" and "569," respectively of social network 56. Upon identifying referendum answers, their corresponding referendum, i.e., referendum "23" of the referendum pool server 54 and the identity of the voters, i.e., members "113," "228" and "569" of social network 56, the digital image 2 is associated with referendum "23" and the accounts of members "113," "228" and "569" of social network 56.

Figure 4:
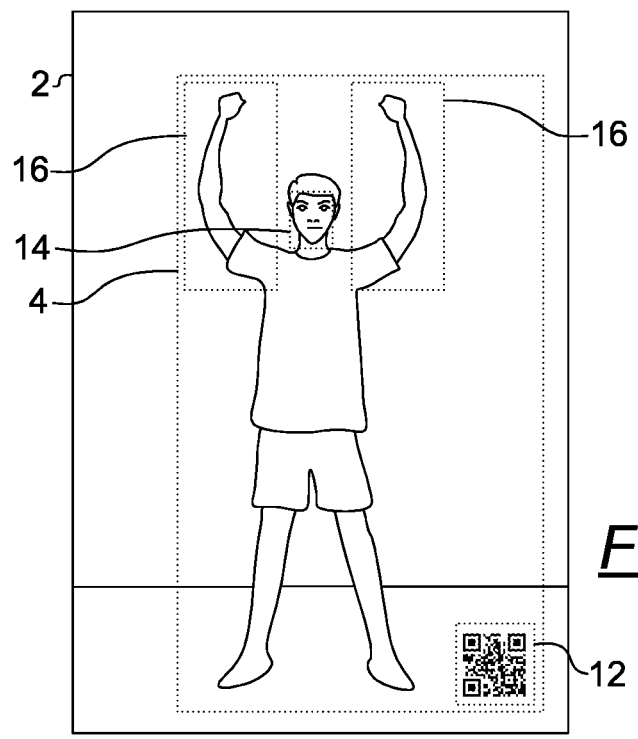
FIG. 4 depicts a digital image of a subject including a voter, a referendum identifier expressed in code and a referendum answer expressed in gestures.
Figure 5:
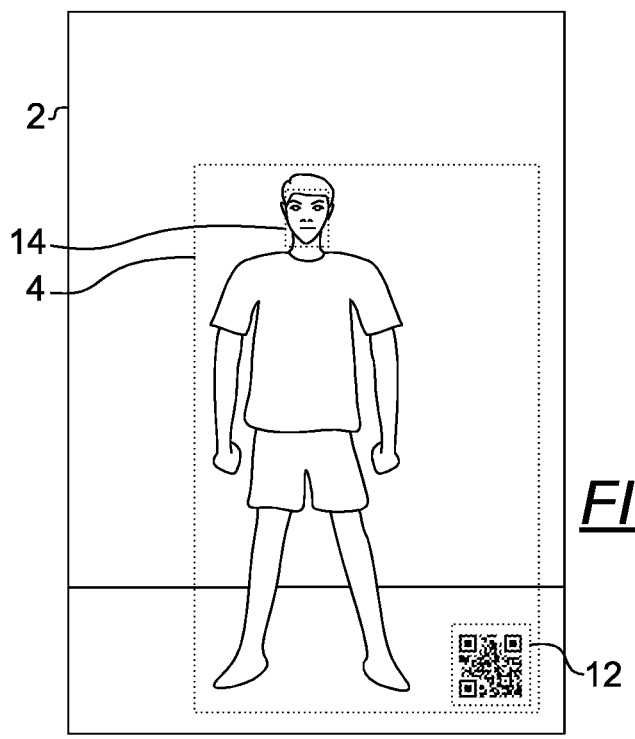
FIG. 5 depicts a digital image of a subject including a voter, a referendum identifier expressed in code and a referendum answer expressed in gestures.

In the ensuing figures, various examples are set forth to more particularly point out various embodiments by which the present invention may be implemented. FIGS. 4 and 5 depict a digital image of a subject including a voter 14, a referendum identifier expressed in code 12 and a referendum answer expressed in gestures 16. It shall be noted that in this example, it is unnecessary for the voter 14 to don a shirt displaying such identifying elements as a symbol and text. The referendum answer is expressed in gestures 16 while the referendum is expressed in a QR code 12 overlaid as the result of post processing of the digital image 2. The referendum answer is indicated as a "yes" with raised arms, wherein each of the raised arms is disposed on one side of the voter 14 in FIG. 4 while the voter 14 in FIG. 5 is depicted without raised arms to indicate an answer of "no." In another embodiment, a positive answer is indicated by a raised thumb. Algorithms for detecting patterns such as a pair of raised arms are well known. U.S. Pat. No. 7,068,843 to Chang et al is hereby incorporated by reference as though set forth in full herein for its teaching regarding pattern detection.

Figure 6:
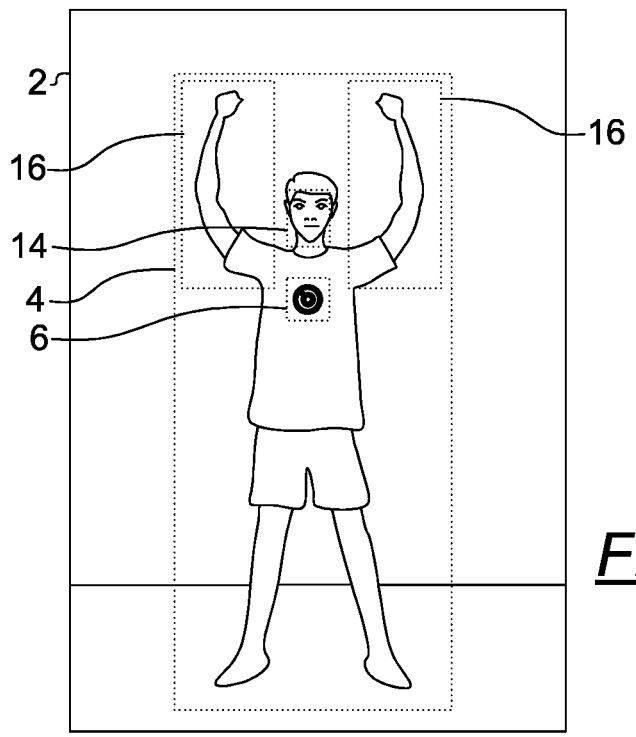
FIG. 6 depicts a digital image of a subject including a voter, a referendum identifier expressed in symbol and a referendum answer expressed in gestures.
Figure 7:
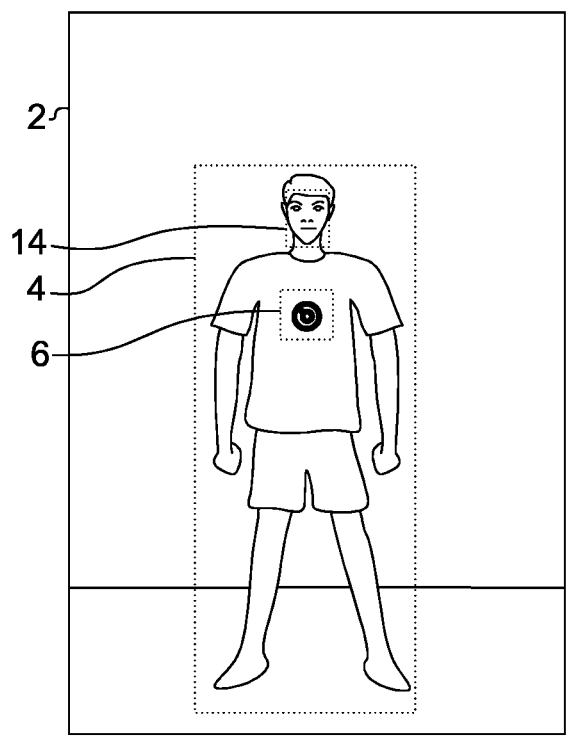
FIG. 7 depicts a digital image of a subject including a voter, a referendum identifier expressed in symbol and a referendum answer expressed in gestures.

FIGS. 6 and 7 depict a digital image of a subject including a voter 14, a referendum identifier expressed in symbol 8 and a referendum answer expressed in gestures 16. It shall be noted that in this example, it is unnecessary to attach a code to indicate the referendum. Instead a symbol 8 indicates the referendum the voter 14 is voting for while gestures 16 indicate the answer to the referendum.

Figure 8:
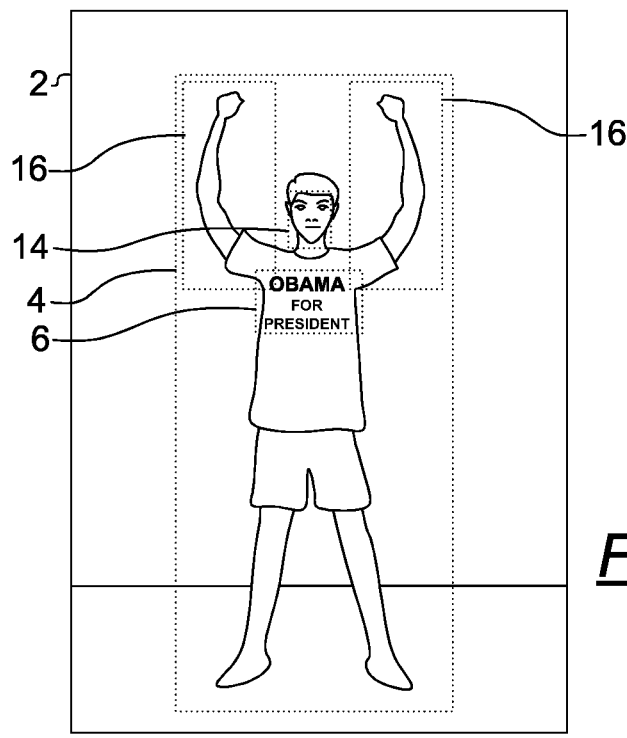
FIG. 8 depicts a digital image of a subject including a voter, a referendum identifier expressed in text and a referendum answer expressed in gestures.
Figure 9:
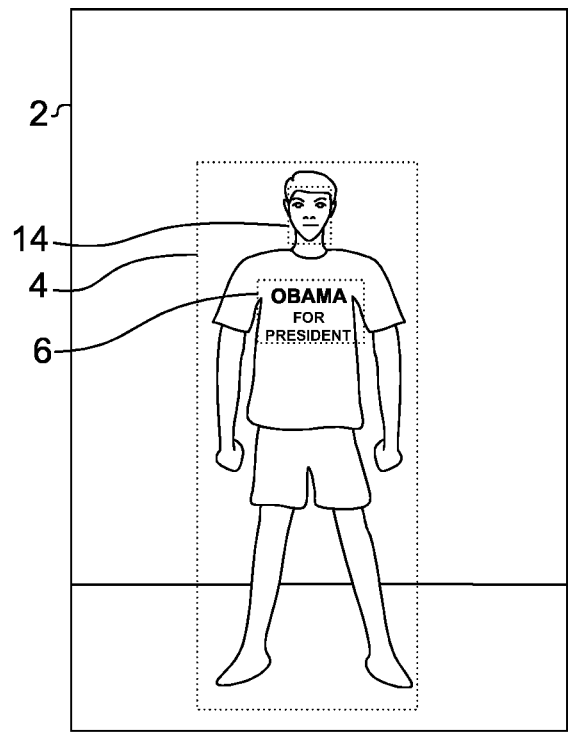
FIG. 9 depicts a digital image of a subject including a voter, a referendum identifier expressed in text and a referendum answer expressed in gestures.

FIGS. 8 and 9 depict a digital image of a subject including a voter 14, a referendum identifier expressed in text 6 and a referendum answer expressed in gestures 16. Unlike FIGS. 6 and 7, text is used to indicate the referendum while gestures 16 indicate the answer to the referendum.

Figure 10:
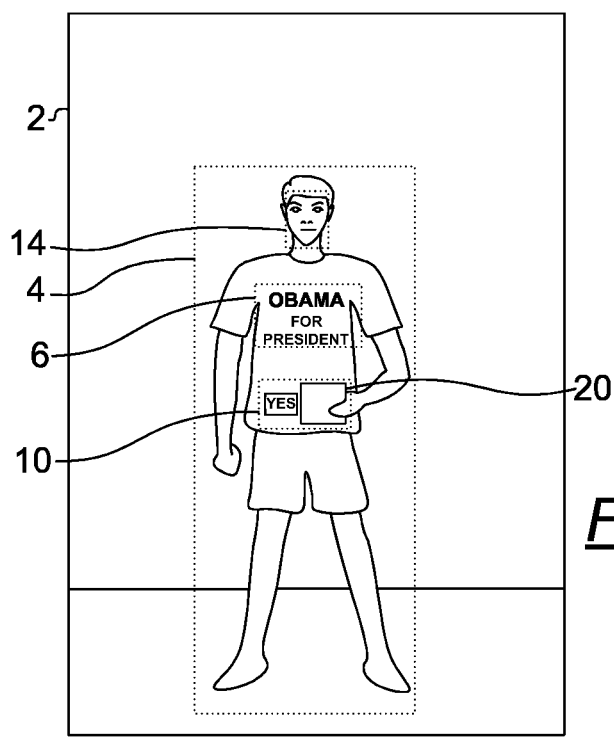
FIG. 10 depicts a digital image of a subject including a voter, a referendum identifier and a referendum answer that are both expressed in text.
Figure 11:
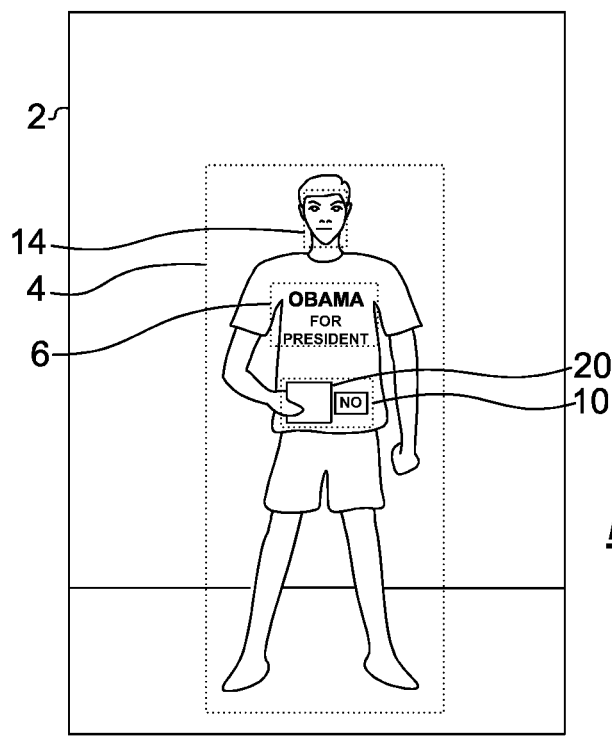
FIG. 11 depicts a digital image of a subject including a voter, a referendum identifier and a referendum answer that are both expressed in text.

FIGS. 10 and 11 depict a digital image of a subject including a voter 14, a referendum identifier and a referendum answer 10 that are both expressed in text. Unlike FIGS. 4-9, text is used to indicate the referendum answer while text is used to indicate the referendum. The two answer choices are provided. However, only one desired answer is revealed. In FIG. 10, the choice "No" is hidden using a cover 20 to indicate an answer of "Yes." This type of voting practice is most commonly used where the shirt is provided to the voter 14 at a public event and the voter 14 is asked to don the shirt and present his or her choice.

Figure 12:
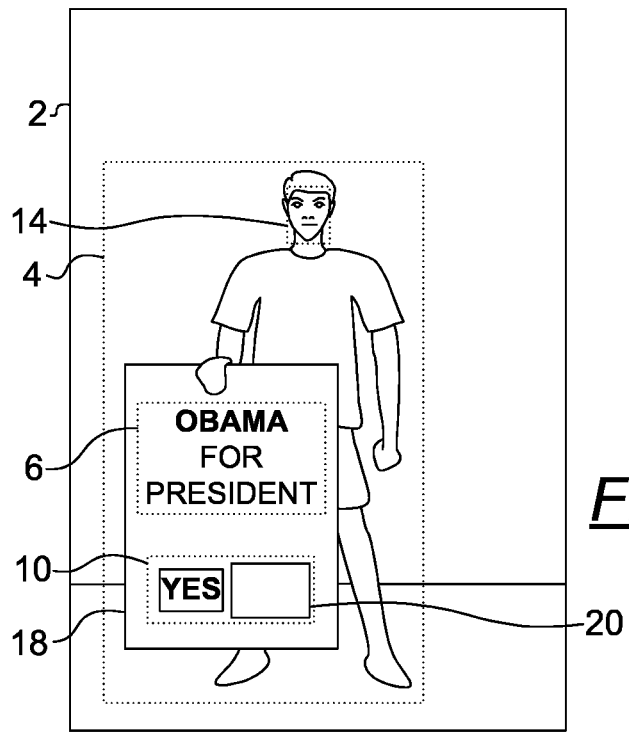
FIG. 12 depicts another digital image of a subject including a voter, a referendum identifier and a referendum answer that are both expressed in text.
Figure 13:
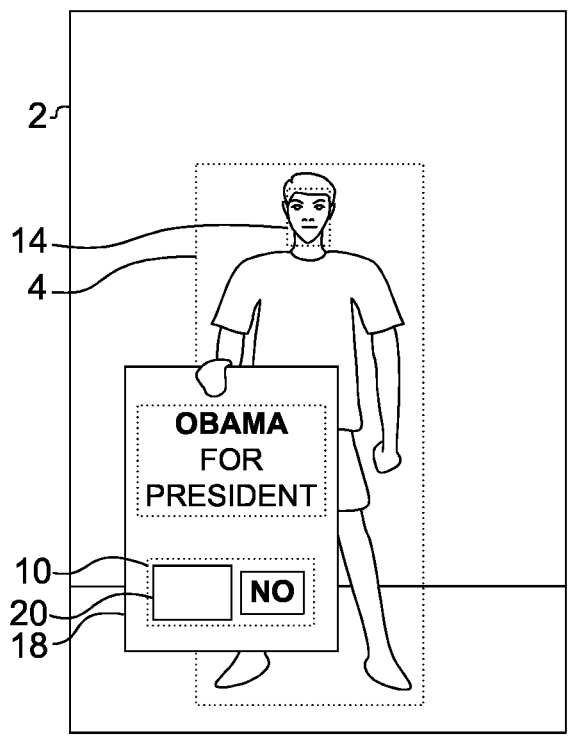
FIG. 13 depicts another digital image of a subject including a voter, a referendum identifier and a referendum answer that are both expressed in text.

FIGS. 12 and 13 depict another digital image of a subject including a voter, a referendum identifier and a referendum answer that are both expressed in text. The subjects of these figures are essentially the same as those of FIGS. 10 and 11 except the subjects are depicted on a cardboard 18 instead of a shirt.

Figure 14:
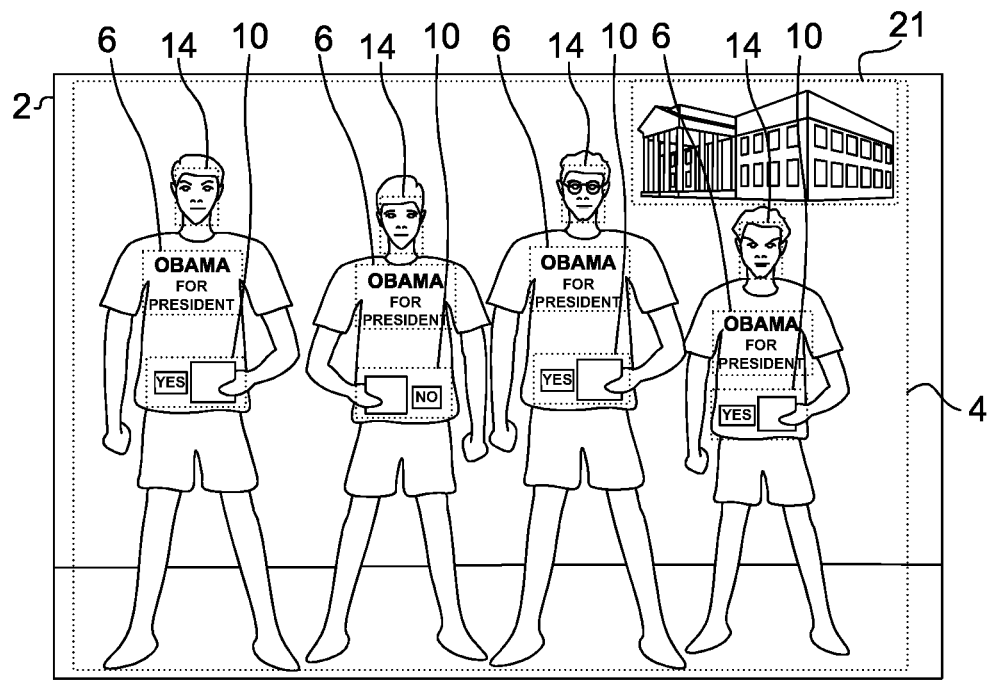
FIG. 14 depicts a digital image of a subject including multiple voters, both multiple referendum identifiers and multiple referendum answers expressed in text and background graphics.

FIG. 14 depicts a digital image of a subject including multiple voters, multiple referendum identifiers expressed in text, multiple referendum answers expressed in text and background graphics 21. In this example, the subject includes four voters 14. Both the referendum and the answer are indicated in text. It is not obvious that multiple voters can be included in one digital image as processing of multiple referendum answers can pose a serious challenge. However, the Applicant discovered that by including multiple voters in one digital image, voters are encouraged or more keen to have their identity revealed for a referendum they are voting for.

Figure 15:
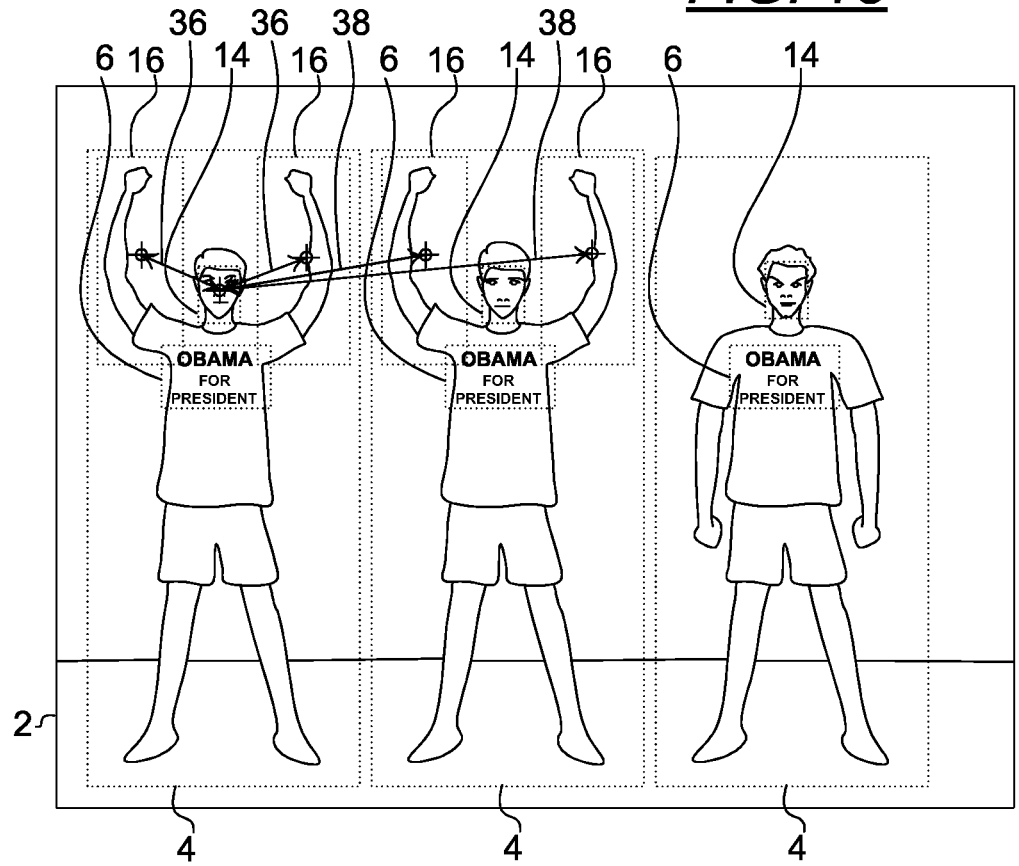
FIG. 15 depicts a digital image of a subject including multiple voters, multiple referendum identifiers expressed in text and multiple referendum answers expressed in gestures.
Figure 16:
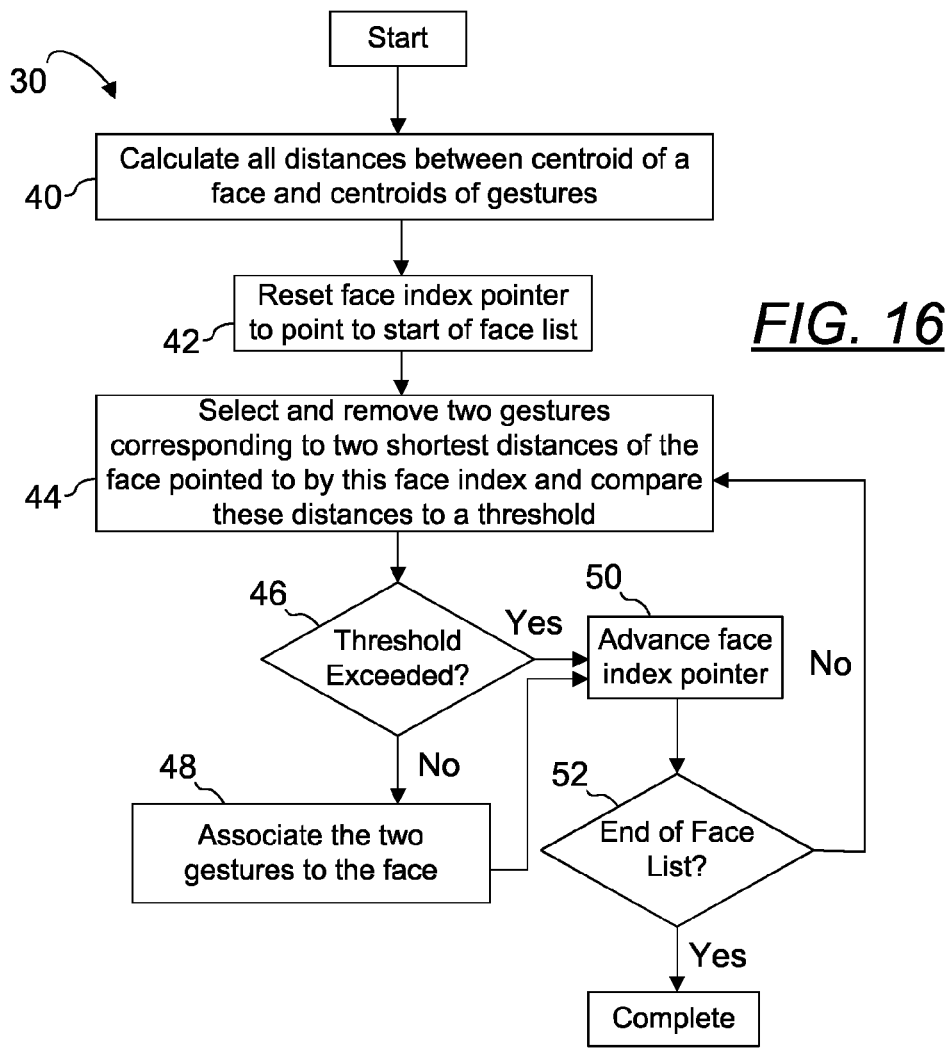
FIG. 16 is a flowchart detailing a method by which a subject including multiple voters, multiple referendums and their corresponding referendum answers are associated.

FIG. 15 depicts a digital image of a subject including multiple voters, both multiple referendum identifiers 6 and multiple referendum answers 10 expressed in text and background graphics 21. FIG. 16 is a flowchart detailing a method by which a subject including multiple voters, multiple referendum markers and their corresponding referendum answers are associated. In this case, upon parsing the subject, there will be three referendum markers expressed in text, three faces and two referendum answers expressed in gestures. It is unnecessary for a user handling the processing of the digital image 2 to specify the type of parsed elements, for instance, referendum marker, referendum answer, face, gesture, as each element detected is unique across the databases to which these elements are compared. For example, an answer "Yes" which appears in a referendum answer database will not appear in a referendum database or a face database. Distinguishing factors may include the number of words as in the case of text. A referendum contains more than one word while a referendum answer contains only one word. Such attribute aids in specifying the list which a referendum marker or a referendum answer is compared to. As for a symbol, face or gesture, the algorithms used to discern such elements mark the type of databases these elements are to be compared to. A symbol represents a referendum marker which should be compared to a referendum database. A face represents an individual which should be compared to a database of individuals. A gesture represents a referendum answer which should be compared to a referendum answer database. Each of the referendum markers is compared to a list of known referendums. If the referendum marker matches a member of the list of known referendums, the member of the list of known referendums is identified as the target referendum. If the referendum marker does not match a member of the list of known referendums, a target referendum is added to the list of known referendums. In identifying a target voter, each voter is compared to a list of known individuals. If the voter matches a member of the list of known individuals, the member of the list of known individuals is identified as a target voter. If the voter does not match a member of the list of known individuals, the voter is added to the list of known individuals. In identifying a target referendum answer, each referendum answer is compared to a list of known answers. If the at least one referendum answer matches a member of the list of known answers, the member of the list of known answers is identified as a target answer. If the referendum answer does not match a member of the list of known answers, the at least one referendum answer is discarded. In associating a target voter to a target referendum and a referendum answer, the following steps are taken. Although the present example shows a mean by which a face is associated to gestures, such means is applicable in associating a face to text. For each element parsed, a rectangular envelope can be determined and placed around the element. For each rectangular envelope, a centroid is then determined. FIG. 16 depicts a means (step 30) by which these envelopes are associated. First, as shown in step 40, all distances between the centroid of a voter's face and the centroid of referendum markers and the centroid of referendum answers 36, 38 are calculated. Referring to FIGS. 15 and 16, referendum answers are provided as gestures. Faces parsed from FIG. 16 are entered in a list. In one embodiment, in establishing association of a voter to a referendum answer, the voter at the start of the list is processed first by resetting 42 the face index pointer to point to the start of the face list although the order in which a voter is processed is not critical. At least one gesture corresponding to the shortest distance associated with a target voter is selected and removed. In this example, two raised arms are used to verify the gestures are meant to indicate a positive response or and answer of "Yes" eventhough a single raised arm may suffice. In order to more accurately associate a gesture to a target voter as shown in step 44, the shortest distance is compared to a threshold. If the threshold is not exceeded by the shortest distance as determined in decision block 46, the gesture is associated with the target voter as shown in step 48. If the threshold is exceeded by the shortest distance, the accuracy of the association of the target voter and the gesture is inconclusive and therefore the referendum answer associated with the target will be treated as negative or "No." The face index pointer is then advanced in step 50 to point to the next face on the list to process. If the face just processed is the last one on the list as checked in step 52, the process of associating target voters to referendum answers has completed. If not, step 44 is repeated.

Variations, modifications, and other implementations of what is described herein will occur to those of ordinary skill in the relevant art(s) without departing from the spirit and scope of the invention.

The examples presented herein are intended to illustrate potential and specific implementations of the invention. It can be appreciated that the examples are intended primarily for purposes of illustration of the invention of the invention for those skilled in the relevant art(s). There may be variations to these diagrams or the operations described herein without departing from the spirit of the present invention. For instance, in certain cases, method steps or operations may be performed or executed in differing order, or operations may be added, deleted or modified.

I claim:

1. A method for conducting a visual referendum of a subject using a computing device, wherein said subject comprises at least one voter, at least one referendum marker and at least one referendum answer, said method comprising:
   (a) providing a digital image of said subject, wherein said digital image includes a face of said at least one voter;
   (b) parsing said at least one voter, said at least one referendum marker and said at least one referendum answer of said subject from the digital image;
   (c) identifying a target referendum based on said at least one referendum marker and identifying at least one target voter based on said at least one voter and identifying at least one target referendum answer based on said at least one referendum answer;
   (d) associating said at least one target referendum answer to said target referendum; and
   (e) associating said at least one target voter to said target referendum, wherein
   said parsing step further comprises the step of representing each of said at least one voter, said at least one referendum marker and said at least one referendum answer with a rectangular envelope having a centroid, and wherein
   one or more steps (a- e) is performed using a processor.

2. The method for conducting a visual referendum of claim 1, wherein said steps of associating said at least one target referendum answer and said at least one target voter to said target referendum comprises:
   (a) calculating all distances between the centroid of each said at least one target voter's face and the centroid selected from the group consisting of said at least one referendum marker and said at least one referendum answer;
   (b) selecting at least one gesture corresponding to the shortest distance associated with each said at least one target voter; and
   (c) comparing the shortest distance to a threshold, whereby if the shortest distance does not exceed said threshold, said at least one gesture is associated with said at least one target voter.

3. The method for conducting a visual referendum of claim 1, further comprising the steps of:
   (a) querying said target voter for willingness to disclose identity, whereby if said target voter indicates unwillingness, the face of said target voter in the digital image is obscured; and
   (b) displaying the digital image at a site corresponding to a group consisting of said target voter and said target referendum.

4. The method for conducting a visual referendum of claim 1, wherein said at least one referendum answer is expressed as at least one gesture of said at least one voter.

5. The method for conducting a visual referendum of claim 4, wherein said at least one gesture comprises a pair of raised arms.

6. The method for conducting a visual referendum of claim 4, wherein said at least one gesture comprises a hand with a raised thumb.

7. The method for conducting a visual referendum of claim 1, wherein said identifying step comprises:
- comparing said at least one referendum marker to a list of known referendums, whereby if said at least one referendum marker matches a member of the list of known referendums, said member of the list of known referendums is identified as a target referendum and whereby if said at least one referendum marker does not match a member of the list of known referendums, said at least one referendum marker is added to the list of known referendums.

8. The method for conducting a visual referendum of claim 1, wherein said identifying step comprises:
- comparing said at least one voter to a list of known individuals, whereby if said at least one voter matches a member of the list of known individuals, said member of the list of known individuals is identified as a target voter and whereby if said at least one voter does not match a member of the list of known individuals, said at least one target voter is added to the list of known individuals.

9. The method of claim 8, wherein said comparing step comprises:
- comparing selected facial features of said at least one target voter to selected facial features of the list of known individuals.

10. The method for conducting a visual referendum of claim 1, wherein said identifying step comprises:
- comparing said at least one referendum answer to a list of known answers, whereby if said at least one referendum answer matches a member of the list of known answers, said member of the list of known answers is identified as a target answer and whereby if said at least one referendum answer does not match a member of the list of known answers, said at least one referendum answer is discarded.

* * * * *